United States Patent [19]

Urabe et al.

[11] Patent Number: 4,591,923
[45] Date of Patent: May 27, 1986

[54] METHOD AND APPARATUS FOR INTENSIFYING SHARPNESS OF PICTURE IMAGES

[75] Inventors: Hitoshi Urabe; Hideaki Kimura, both of Kaisei, Japan

[73] Assignee: Fuji Photo Film Co., Ltd., Kanagawa, Japan

[21] Appl. No.: 647,828

[22] Filed: Sep. 5, 1984

[30] Foreign Application Priority Data

Sep. 5, 1983 [JP] Japan ................. 58-162951

[51] Int. Cl.$^4$ ............... G03F 3/08; H04N 1/40
[52] U.S. Cl. .................. 358/284; 358/280; 358/80
[58] Field of Search ............ 358/80, 280, 284, 75, 358/282, 87

[56] References Cited

U.S. PATENT DOCUMENTS

| | | | |
|---|---|---|---|
| 4,005,475 | 1/1977 | Knop | 358/80 |
| 4,237,481 | 12/1980 | Aughton | 358/80 |
| 4,484,232 | 11/1984 | Gast | 358/284 |
| 4,539,478 | 9/1985 | Sanio | 358/284 |

Primary Examiner—Howard W. Britton
Assistant Examiner—John K. Peng
Attorney, Agent, or Firm—Wenderoth, Lind & Ponack

[57] ABSTRACT

It will be said that a method for changing a sharpness intensifying coefficient with parameters of two signals, i.e. a sharp signal and an edge signal has not been established up to these days in spite of existing these two signals which are considered as parameters in the sharpness intensifying process. In order to intensify sharpness of a picture image to be processed, a difference between a sharp signal and an unsharp signal of the picture image is first obtained as an edge signal and the thus obtained edge signal is then multiplied by a coefficient for determining the degree of the sharpness intensification thereby to obtain a sharpness intensifying signal. The sharpness intensifying signal is added to the sharp signal in the adder, whereby sharpened signal is outputted from the adder.

5 Claims, 9 Drawing Figures

SHARP SIGNAL

EDGE SIGNAL

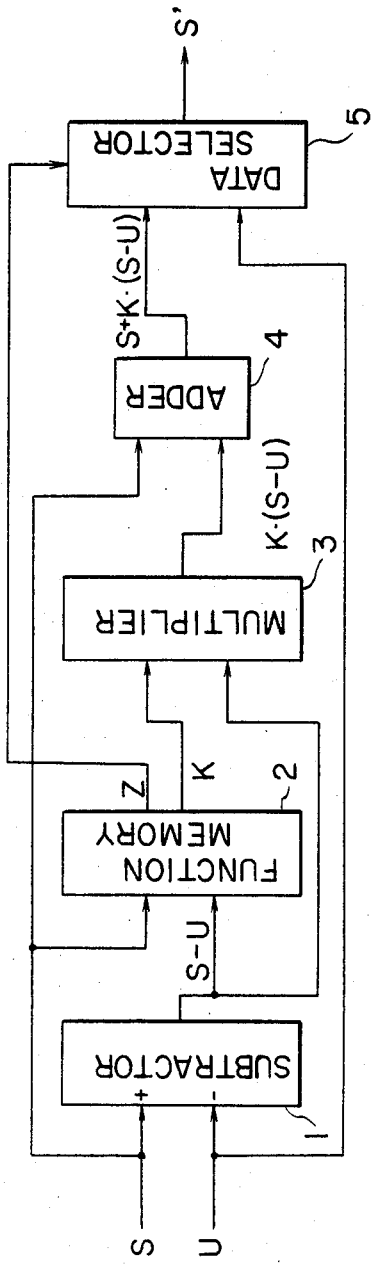
F I G. 5

METHOD AND APPARATUS FOR INTENSIFYING SHARPNESS OF PICTURE IMAGES

BACKGROUND OF THE INVENTION

This invention relates to a method and an apparatus for intensifying sharpness of picture images used for a color scanner for plate making, a laser color printer, a facsimile and the like for a graphic art.

Well known is a general method for intensifying sharpness of a picture image in which a sharpness intensifying signal is first obtained by multiplying an edge signal $S-U$ (shown in FIG. 1C), which is the difference between a sharp signal S (shown in FIG. 1A) and an unsharp signal U (shown in FIG. 1B), both obtained by the image by a coefficient K for determining the degree of the sharpness intensification of the picture image, and the obtained sharpness intensifying signal is then added to the sharp signal S thereby to obtain a sharpened signal $S'\ (=S+K\cdot(S-U))$ as shown in FIG. 1D. However, in such a prior art method, in case the sharpness intensifying process is carried out with the coefficient K being constant, is adversely intensified a noise of low level which may be added in an image signal at a time of photoelectric conversion by means of a photo-multiplier. The intensifying of the low level noise in this process makes the noise of the image after processing also intensified, and moreover, it is impossible to selectively intensify the sharpness of the picture image in accordance with density zones.

In order to obviate such defect regarding the noise intensification as described above, is also known a method in which when a dead zone value D is set and an equation $|S-U|<D$ is satisfied, an equation $S'=S$ is obtained without carrying out the sharpness intensifying process (U.S. Pat. No. 4,005,475). In this prior art method, however, since a device such as a photo-multiplier used for the photoelectric conversion of the picture image tends to provide a high level noise particularly on the high density side, the degree of the sharpness intensification of the image on the low density side becomes insufficient when the dead zone value D is suitable for a noise level on the high density side. In addition, although the selective intensification of the sharpness of the picture image based on the density zone can be done by changing the sharpness intensifying coefficient K due to the sharp signal, in this case, problems regarding the noise must be considered independently of the above fact.

SUMMARY OF THE INVENTION

An object of this invention is to obviate defects or problems in prior art technique described above and to provide a method and an apparatus for intensifying sharpness of a picture image to be processed wherein the image sharpness intensifying coefficient is determined as a function of a sharp signal and an edge signal which is the difference between the sharp signal and an unsharp signal representing the image to be processed.

According to this invention, there are provided a method and an apparatus for intensifying sharpness of a picture image to be processed in which a difference between a sharp signal and an unsharp signal of an image to be processed is obtained as an edge signal by means of a subtractor, the edge signal is multiplied by a coefficient for determining the degree of the sharpness intensification of the picture image by means of a multiplier to obtain a sharpness intensifying signal, and the sharp signal is added to the sharpness intensifying signal, whereby the sharpness intensifying coefficient is obtained as a function of the sharp signal and the edge signal.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is also a block diagram showing another embodiment of this invention corresponding to FIG. 2.

DESCRIPTION OF THE PREFERRED EMBODIMENTS

This invention will now be described in detail with reference to attached drawings.

Figure 1A:
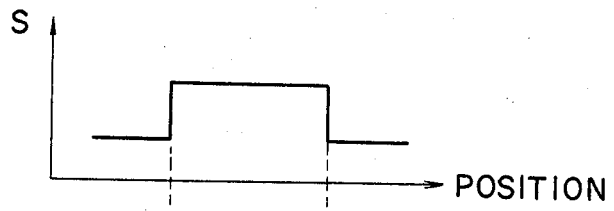
FIG. 1A through FIG. 1D are graphs for explaining a general method of intensifying a sharpness of a picture image.
Figure 1B:
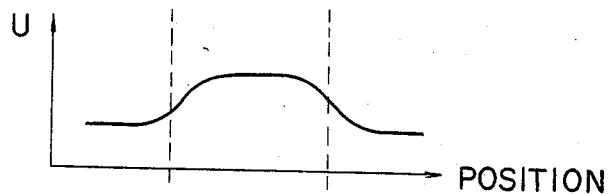
Figure 1C:
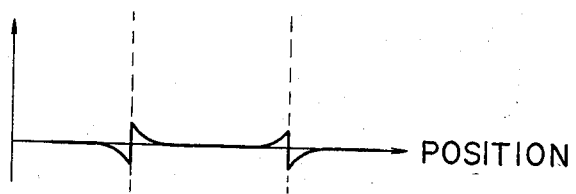
Figure 1D:
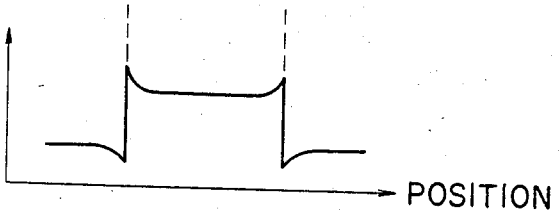
Figure 2:
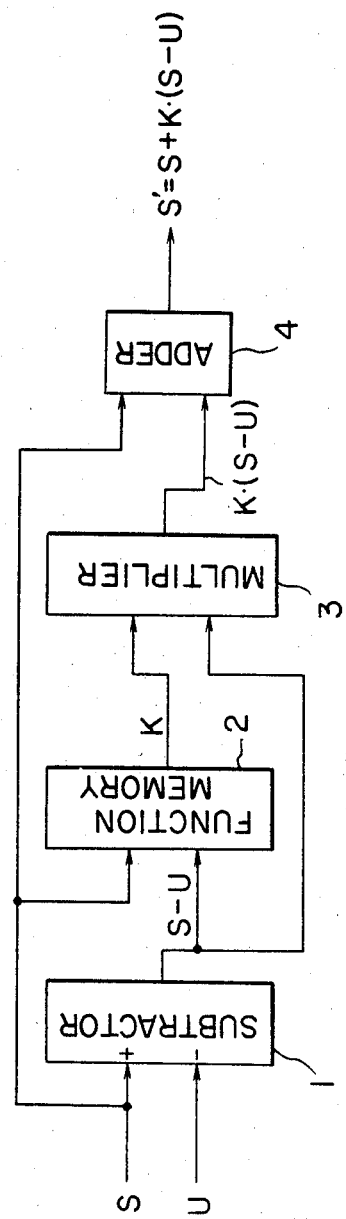
FIG. 2 is a block diagram showing one embodiment of an apparatus for carrying out an image sharpness intensifying method according to this invention.

FIG. 2 is a block diagram showing an apparatus for realizing a method for intensifying sharpness of a picture image according to this invention, in which a sharp signal S and an unsharp signal U formed from an image signal and represented as digital amounts are respectively inputted into a subtractor 1 to thereby obtain an edge signal $S-U$ also represented as a digital amount. The sharp signal S and the unsharp signal U are obtained by using well known technique, for example, in a manner described in Japanese Laid-open No. 57716/1974, respectively. The sharp signal S is on the other hand inputted into a function memory 2 and an adder 4, and the edge signal $S-U$ is inputted into the function memory 2 and a multiplier 3. In the function memory 2 is stored a function $f(S, S-U)$ for a sharpening process in the form of a table which is set in advance, and a coefficient K is obtained in accordance with the inputted values representing the sharp signal S and the edge signal $S-U$. The thus obtained coefficient K is inputted into the multiplier 3 together with the edge signal $S-U$ and the multiplied result $K\cdot(S-U)$ is then inputted into the adder 4 into which the sharp signal S has beforehand been inputted. The output from the adder 4 is represented by a sharpened signal $S'$, i.e., $S+K\cdot(S-U)$.

Figure 3:
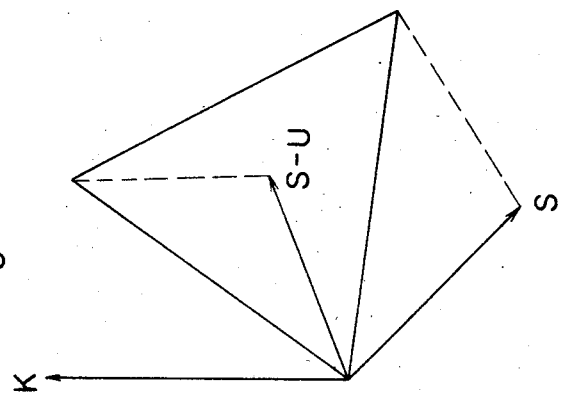
FIG. 3 is a diagram showing one embodiment of a function K stored in a function memory of this invention.
Figure 4A:
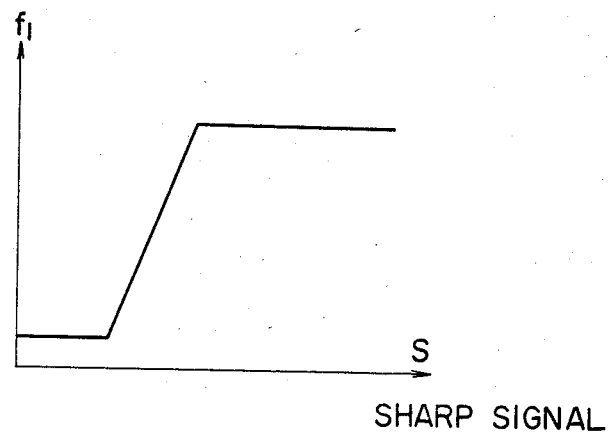
FIGS. 4A and 4B are diagrams showing another embodiment of the function K thereof.
Figure 4B:
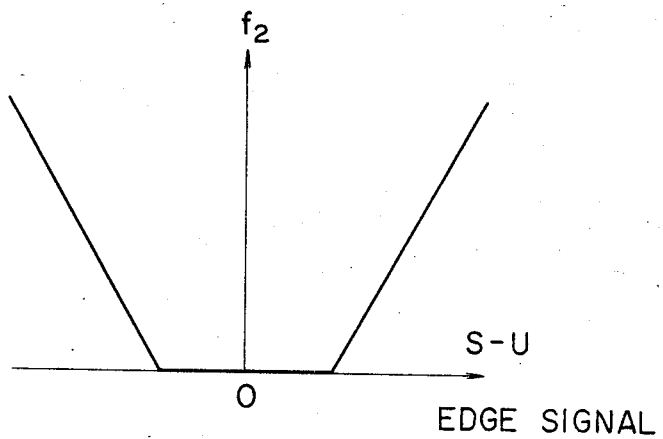

In the function memory 2 is an advance stored data most suitable for intensifying the sharpness of an image pattern without intensifying the noises at the respective density levels and edge signal levels as a function $K=f(S, S-U)$. For example, in order to reduce the deffect of shot noises in a photoelectric converting system, the noises of the image to be processed will be suppressed in accordance with the characteristics of the photoelectric converting system in the manner that the coefficient K is made to be small at a density zone provided with large noises and the area of the edge signal $S-U$ is made to be large at which the coefficient K reduces as the density of the image becomes high at which the sharp signal S becomes large. The coefficient K of this case is shown in FIG. 3. Further, a function $f_1(S) \cdot f_2(S-U)$ is considered as the function $K=f(S, S-U)$ stored in the function memory 2. In this case, the coefficient K is a product of a function $f_1(S)$ of the sharp signal S shown in FIG. 4A by a function $f_2(S-U)$ of the edge signal $S-U$ shown in FIG. 4B. According to this sharpness intensifying coefficient K, the sharpness intensification of the skin color density zone is suppressed by the function $f_1(S)$ and the same of the noise component is suppressed by the function $f_2(S-U)$. In an alternation, the function memory 2 can be constructed to contain data most suitable for every picture image to be processed by, for example, connecting a computer to the function memory 2.

FIG. 5 shows another embodiment similar to that shown in FIG. 2 according to this invention, in which a data selector 5 is further incorporated to the apparatus shown in FIG. 2, and to the data selector 5, are inputted a signal representing the result $S+K\cdot(S-U)$ obtained by the adder 4 and the unsharp signal U. In this embodiment, from the function memory 2 is outputted a signal Z which has usually a logic level of "0" but a logic level of "1" when the coefficient K is zero, the signal Z being used as a select signal for the data selector 5. In other words, when the coefficient K, being the output of the function memory 2, is not zero, the logic level of the signal Z is zero and the data selector 5 outputs the sharpened signal $S'(S'=S+K\cdot(S-U))$, and on the other hand, when the coefficient K is zero, the logic level of the signal Z is "1" and the data selector 5 outputs the signal $S'(S'=U)$ which shows a lowered granular degree of the image, whereby the intensification of the sharpness and the lowering of the granular degree of the image can simultaneously be performed.

As described above, according to this invention, the image sharpness intensifying coefficient K can be selected dependent on the values of the sharp signal S and the edge signal $S-U$, so that the intensification of the sharpness of the image can freely be controlled. Particularly, the noise can be suppressed in accordance with the characteristics of the photoelectric converting system, and moreover, by selecting the unsharp signal U instead of the logic value $S+K\cdot(S-U)$ as $K=0$ from the data selector when the edge signal $S-U$ is small, the granular degree of the image is lowered, and therefore, the image sharpness intensification and the lowering of the granular degree can separately be used. In addition, it is also possible to make obscure the entire output image by selecting the coefficient K to be a negative value.

In the foregoing description, although the image signals are referred to regardless of their colors, i.e. white, black and colored images, with the density zone corresponding to the skin color, the sharpness of the image can be intensified without degrading the granular condition of the skin color portion by making small the coefficient K up to the zone having a considerably large absolute value of the edge signal $S-U$. This fact is also a significant advantage of this invention.

It is to be understood by those skilled in the art that the foregoing description refers to preferred embodiments of this invention and that various modifications and changes may be made without departing from the scope and spirit of this invention as defined in the appended claims.

What is claimed is:

1. In a method for intensifying sharpness of a picture image to be processed of the type comprising the steps of forming a sharp signal and an unsharp signal from a signal representing an image, multiplying an edge signal which is the difference between said sharp signal and said unsharp signal by a coefficient for determining degree of sharpness intensification to obtain an image sharpness intensifying signal, and adding said sharp signal to said image sharpness intensifying signal to perform a sharpening process of the picture image, the improvement in which said coefficient is processed as a function of said sharp signal and said edge signal.

2. The method according to claim 1 wherein said unsharp signal is selected as said sharpened signal when said coefficient is zero.

3. An apparatus for intensifying sharpness of a picture image comprising:
    means for subtracting an unsharp signal of a picture image to be processed from a sharp signal of the picture image to obtain an edge signal;
    means for storing a function table accessed by said sharp signal and said edge signal to obtain a coefficient for determining degree of sharpness intensification of the picture image;
    means for multiplying said edge signal by said coefficient; and
    means for adding the result from said multiplying means to said sharp signal in order to obtain a sharpened signal.

4. The apparatus according to claim 3 wherein there is further provided a data selector which outputs said sharpened signal when said coefficient is not zero and said unsharp signal when said coefficient is zero.

5. The apparatus according to claim 4 wherein said data selector is controlled by a signal read out from said means for storing.

* * * * *